(12) United States Patent
Becker

(10) Patent No.: US 7,150,135 B2
(45) Date of Patent: Dec. 19, 2006

(54) DEVICE FOR ASSEMBLING LONGITUDINAL EDGES OF PANELS, LATHS OR WAINSCOTS, WITH FORCE DISTRIBUTION

(75) Inventor: Arnaud Becker, Brumath (FR)

(73) Assignee: Espace Production International EPI, Marlenheim (FR)

( * ) Notice: Subject to any disclaimer, the term of this patent is extended or adjusted under 35 U.S.C. 154(b) by 386 days.

(21) Appl. No.: 10/276,517

(22) PCT Filed: Apr. 11, 2001

(86) PCT No.: PCT/FR01/01119

§ 371 (c)(1),
(2), (4) Date: Jul. 1, 2003

(87) PCT Pub. No.: WO01/88307

PCT Pub. Date: Nov. 22, 2001

(65) Prior Publication Data

US 2004/0035080 A1     Feb. 26, 2004

(51) Int. Cl.
  *E04F 15/14*     (2006.01)
  *E04F 13/21*     (2006.01)

(52) U.S. Cl. .................... 52/592.1; 52/592.4; 403/381; 428/192

(58) Field of Classification Search .............. 52/592.1, 52/592.4; 403/381; 428/192
See application file for complete search history.

(56) References Cited

U.S. PATENT DOCUMENTS

| | | | | |
|---|---|---|---|---|
| 316,175 A | * | 4/1885 | Putney | .................... 52/506.05 |
| 890,436 A | * | 6/1908 | Momberg | ................. 52/506.01 |
| 1,124,228 A | * | 1/1915 | Houston | ...................... 403/381 |
| 2,004,917 A | * | 6/1935 | Johnson | ...................... 52/506.1 |
| 2,227,878 A | * | 1/1941 | Crooks | .......................... 52/364 |
| 3,713,264 A | * | 1/1973 | Morgan, Jr. | .............. 52/506.06 |
| 6,345,481 B1 | * | 2/2002 | Nelson | ....................... 52/592.2 |
| 6,536,178 B1 | * | 3/2003 | Pålsson et al. | ............. 52/589.1 |
| 6,584,747 B1 | * | 7/2003 | Kettler et al. | ............... 52/592.2 |
| 6,772,569 B1 | * | 8/2004 | Bennett et al. | ............. 52/592.1 |
| 2003/0154684 A1 | * | 8/2003 | Becker | ........................ 52/592.1 |
| 2003/0177730 A1 | * | 9/2003 | Bloomfield | ................. 52/592.1 |
| 2004/0035080 A1 | * | 2/2004 | Becker | ........................ 52/592.1 |

FOREIGN PATENT DOCUMENTS

| | | |
|---|---|---|
| DE | 39 13 383 | 10/1990 |
| DE | 41 30 115 | 3/1993 |
| GB | 1 361 805 | 7/1974 |
| WO | WO 00/47841 | 8/2000 |

* cited by examiner

*Primary Examiner*—Robert Canfield
(74) *Attorney, Agent, or Firm*—Young & Thompson

(57) ABSTRACT

The invention concerns a device for assembling longitudinal edges of panels, laths or wainscots (1), consisting of at least a male part (2) equipping a longitudinal edge of said panels, laths or wainscots (1) and of at least a female part (3) with matching shape provided on the other longitudinal edge of said panels, laths or wainscots (1). Said device is characterised in that it provides force distribution and the longitudinal edges bearing the male (2) and female (3) parts extend along parallel oblique planes. The invention is particularly suited for the building sector, in particular for floor covering, wall sheathing and ceiling panelling, particularly in the form of panels, laths or wainscots of different materials, such as wood, skin materials, synthetic materials.

37 Claims, 7 Drawing Sheets

DEVICE FOR ASSEMBLING LONGITUDINAL EDGES OF PANELS, LATHS OR WAINSCOTS, WITH FORCE DISTRIBUTION

The present invention relates to the field of construction, in particular the covering of floors, walls or ceilings, particularly in the form of panels, laths or wainscots of different materials, such as wood, layered materials, synthetic materials . . . , and has for its object a device for assembling the longitudinal edges of such panels, laths or wainscots, with distribution of forces.

At present, the elements for covering floors, walls or ceilings are generally present in the form of panels, laths or wainscots made of different materials, such as solid wood, particle board provided with a synthetic coating or solid wood or entirely of synthetic material having a textured visible surface.

These different elements are generally assembled together by known means of the tongue and groove type, two adjacent sides of these elements being for example provided with a tongue adapted to coact with grooves provided on the two corresponding sides of the corresponding elements. Thus, each element has two tongues on two adjacent sides, the two other sides being provided with grooves.

These assembly means generally permit correctly accommodating the requirements for connection of elements together and for placing at the same level these elements but require, for holding the assembly and the joint perfectly, the use of glue or else gripping means on the lower surface and for securement of the latter to battens or the like.

However, securement to a batten inevitably leads to creation of an empty space below the covering elements, which is often incompatible with the desired effect, namely for example for the laying of floor coverings called floating parquet. Thus, in such a case, the covering elements must be disposed directly on a bed layer or the like, possibly with the interposition of a sound and/or heat insulation element. In such a case, it is strictly necessary to provide gluing of the different elements together at their longitudinal and lateral tongue and groove joints.

To avoid these difficulties, it has been proposed to provide panels, laths or wainscots, near their tongue and groove assembly means along their longitudinal edges, with a mechanical device improving the quality of assembly by creation of an anti-misalignment means in assembled position, which is to say when two successive elements are assembled by tongue and groove and are disposed flat. This mechanical device moreover permits, in the flat assembled position, movement along the longitudinal axis of the elements, so as to promote mating of their end tongues in the corresponding end groove of the adjacent element.

Such mechanical devices are essentially of two types, namely using supplemental mechanical gripping portions, or provided with an integrated gripping portion, and are known from EP-A-0 877 130, EP-A-0 855 484, EP-A-0 969 164, EP-A-0 969 163, WO-A 99/66152, WO-A 99/66151, WO-A 98/24995, WO-A 98/24994 and WO-A 97/4783.

The supplemental mechanical portions are, either profiles with a cross-section in the form of a hook, or hooks uniformly distributed along all the length of the elements and coacting with grooves of corresponding shape provided in the edges of said elements.

Such elements of course permit a correct connection between the panels, laths or wainscots, but require specific positioning maneuvers, namely, an engagement of the connection elements and an inclined position of the panels, laths or wainscots, relative to each other, then return to horizontal position of these latter for their lateral engagement, or a preliminary positioning of the connection panels with a cross-section in the form of hooks, on the edge of one of the panels, laths or wainscots and the engagement of the other end of these profiles below the corresponding edge of the adjacent panels, laths or wainscots, the lateral engagement being effected after this mechanical connection along the longitudinal edges.

These known supplemental mechanical connection devices however have the drawback of being of a relatively complicated construction, using simultaneously tongue and groove assemblies and a mechanical means for holding in the service position, preventing any sliding of a panel, lath or wainscot relative to another perpendicular to their longitudinal edges.

Moreover, in the case of production of a mechanical connection between longitudinal edges by means only of the coaction of the shape of the supplemental elements forming an integral part of the panels, laths or wainscots and machined together with assembly tongues and grooves, there arises, on the one hand, a problem of machining the mechanical connection elements, and, on the other hand, a problem of reliability over time of the mechanical connection elements. Thus, the connection and assembly means known from the above documents are essentially adapted to ensure perfect mounting of the panels, laths or wainscots with an assembly without play at their joints, equivalent to a conventional assembly by gluing the panels, laths or wainscots together or by nailing the latter on support battens, whilst permitting complete disassembly for possible reassembly at another use site.

Machining the mechanical connection elements directly adjacent the longitudinal edges requires the use of relatively precise and extremely sharp tools, so as to permit the production of thin walls resulting necessarily from machining the panels, laths or wainscots of very small thickness. As a result, the tools used are of high cost and the machining itself requires verification at relatively short regular intervals to avoid fluctuations of dimensions rising from relatively rapid wear of the cutting tools used. These machining problems have the logical result of a corresponding increase in the price of the panels, laths or wainscots.

Moreover, the production of mechanical holding elements in the form of relatively thin walls and of elements projecting from these walls, gives rise to a certain fragility of these mechanical elements which has the result of a relatively rapid destruction of said elements during repeated assembly and disassembly manipulations of the panels, laths or wainscots thus equipped. Thus, because of the inter-engagement of the mechanical element with each other and of holding with a slight gripping the corresponding longitudinal edges of the panels, laths or wainscots thus equipped, these mechanical elements are stressed by a traction force perpendicular to the longitudinal edges, as well as by flexural forces, during each assembly or disassembly.

It has also been proposed, in WO-A-97/4783, to provide an assembly and holding means in the form of a longitudinal element of transverse cross-section of the arc of a circle, whose female portion is provided with a longitudinal edge of a panel, a lath or a wainscot and whose male portion, in the form of a hook, is on the opposite longitudinal edge. Theoretically, such an assembly permits simultaneously perfect holding at the joint, in the service position. However, the stability of this assembly cannot be ensured, because of inequality of the floor or support, in particular in the form of a hollow, will have the result of the possibility of disassembly of the assembly because taking up a vertical load is not foreseen. Such an effect is further accentuated if the blades are disposed on a sound and/or heat insulating flexible support. Moreover, the production of such an assembly means by machining is totally impossible, in particular on the edges of the panels, laths or wainscots of small thickness.

Finally, all the known assembly devices have the drawback of being relatively fragile at the joints, because the connection tongue between the panels, laths or wainscots is of relatively small thickness and must completely absorb the forces at said joints and in particular the large shear forces that arise in the case of positioning above an empty space due to inequality of the floor or the like.

The present invention has for its object to overcome the drawbacks of the assembly and holding devices known to date, by providing assembly devices for the longitudinal edges of such panels, laths or wainscots, with distribution of forces, permitting ensuring simultaneously, by coaction of shape, a perfect and automatic joining of the adjacent longitudinal edges of the panels, laths or wainscots and a self-gripping of said panels, laths or wainscots against each other, along said longitudinal edges, in particular under a load, as well as a distribution of the forces applied along the joints.

To this end, the assembly device for the longitudinal edges of such panels, laths or slats, which is constituted by at least one male portion on a longitudinal edge of said panels, laths or slats and by at least one female portion of corresponding shape on the other longitudinal edge of said panels, laths or slats, is characterized in that it has a distribution of forces and in that the longitudinal edges carrying the male and female portions extend along oblique parallel planes.

The invention will be better understood from the description hereafter, which relates to preferred embodiments, given by way of non-limiting examples, and explained with reference to the accompanying schematic drawings, in which.

Figure 1:
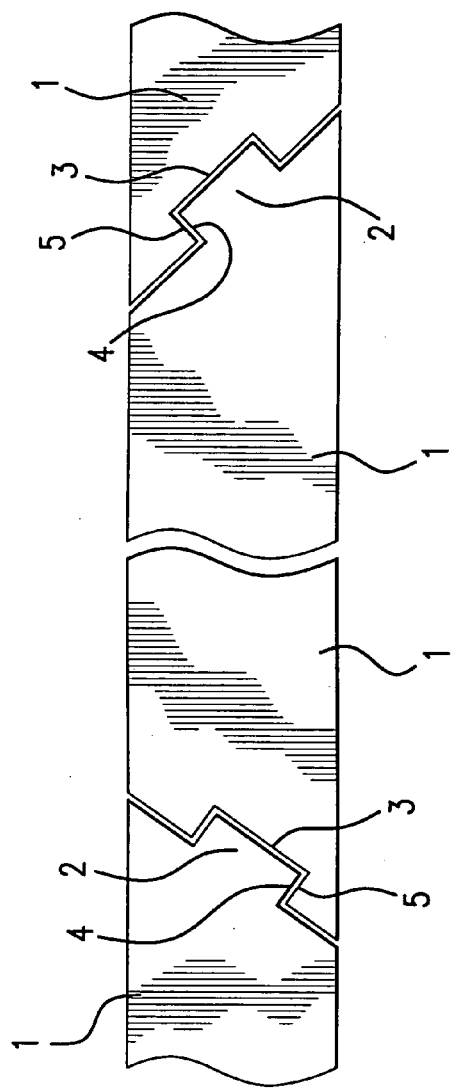
FIG. 1 is a side elevational view in cross-section of two possible modifications of the device according to the invention.
Figure 2:
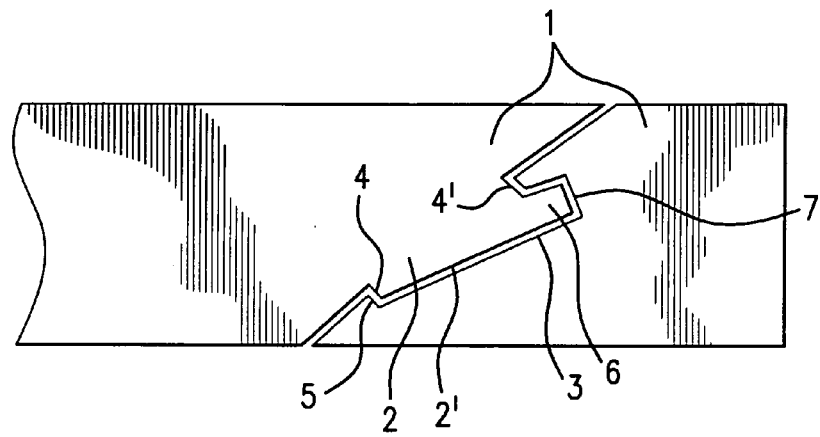
FIGS. 2 and 3 show, in side elevation and in cross-section, two embodiments of another modification of the invention.
Figure 3:
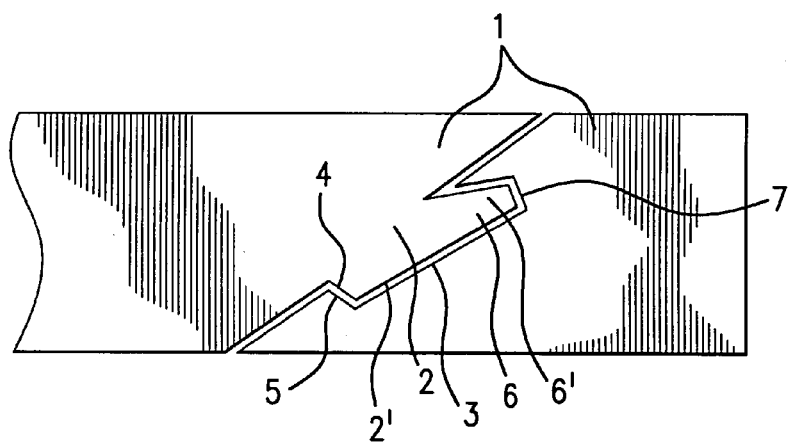

FIGS. 1 to 3 of the accompanying drawings show an assembly of two panels, laths or wainscots 1 by means of an assembly device for the longitudinal edges, which is constituted by at least one male portion 2 on a longitudinal edge of said panels, laths or wainscots 1 and by at least one female portion 3 of corresponding shape on the other longitudinal edge of said panels, laths or wainscots 1.

According to the invention, this assembly device for the longitudinal edges of the panels, laths or wainscots 1 is with distribution of forces and the longitudinal edges carrying the male portion 2 and female portion 3 extend along oblique parallel planes.

The joint between two successive panels, laths or wainscots 1 can be carried out in line with the end of the male portion, in line with the male and female portions 2 and 3, or outside the vertical plane comprising the male and female portions 2 and 3.

Such an embodiment of the longitudinal edges permits distribution of the forces applied in line with the joints such that the assembly device properly so called, formed by the male and female portions 2 and 3, is subjected to very small stress, in particular as to shear forces.

The male and female portions 2 and 3 are present respectively in the form of a longitudinal tongue inclined substantially at a right angle relative to a first longitudinal edge carrying it and a recess of corresponding shape provided in the other longitudinal edge and whose inclination is complementary to that of the tongue on the first longitudinal edge. Thus, as shown in FIG. 1 of the accompanying drawings, the tongue forming the male portion 2 can extend upwardly or downwardly and coact with a recess 3 forming the female portion.

According to a characteristic of the invention, the male and female portions 2 and 3 can be in simple tongue and groove form of square or rectangular cross-section extending perpendicular to the oblique longitudinal edges of said panels, laths or wainscots 1 (FIG. 1). Thus, after assembly of the edges, the panels, laths or wainscots 1 are interconnected without the possibility of mutual movement perpendicular to their longitudinal edges.

According to a characteristic of the invention, the assembly device is provided moreover with self-locking means, self-joining and holding means in the service position.

This self-locking, self-joining and holding means in the service position is preferably present in the form of at least one longitudinal shoulder 4 connecting at least one edge of the tongue 2, forming the male portion of the device, to the corresponding longitudinal edge and coacting with another shoulder 5 provided on the corresponding edge delimiting the female portion 3 of the assembly device (FIGS. 1 to 3). Thus, at the end of the assembly operation, the shoulder 4, which is connected substantially perpendicularly to the oblique edge of the panel, lath or wainscot and which forms with this latter substantially a right angle, fits with the corresponding angle formed by the shoulder 5 and the corresponding edge of the adjacent panel, lath or wainscot. The interfitting thus carried out prevents any disassembly of two consecutive panels, laths or wainscots by movement relative to the support. Moreover, the coaction of shape thus provided permits obtaining a self-gripping of the assembly under load, the cooperating portions being gripped against each other when a load is applied at the joints.

According to a characteristic of the invention, the male portion 2 in the form of a longitudinal tongue preferably has, on the side 4' opposite that forming the shoulder 4, a portion 6 laterally projecting from this side 4' and forming an acute angle relative to the oblique surface carrying the male portion 2, this laterally projecting portion 6 coacting with an opening 7 of the recess forming the female portion 3 (FIGS. 2 and 3). The provision of such a projecting portion 6 permits supplemental locking of the assembly and avoids any possibility of rising of the panel, lath or wainscot 1 on the side comprising the tongue 2 or male portion.

To facilitate penetration of the laterally projecting portion 6 of the male portion 2 into the recess forming the female portion 3, said laterally projecting portion 6 is in the form of a longitudinal appendix having a transverse cross-section narrowing from the longitudinal edge of the panel, lath or wainscot 1 in a direction of the free end of said longitudinal appendix. The surface 2' of the male portion 2 connecting the sides 4 and 4' or the side 4 and the extreme edge of the laterally projecting portion 6 of the male portion 2 is preferably present in the form of a flat surface.

In the course of the insertion of the male portion 2 into the female portion 3, the laterally projecting portion 6 penetrates the corresponding recess 7 of the female portion 3 and is finally locked into this position, during application of the shoulder 4 of the male portion 2 against the shoulder 5 of the female portion 3.

According to a characteristic of the invention, the laterally projecting portion 6 of the male portion 2 is connected to the longitudinal edge carrying said male portion 2 by a side 4', substantially perpendicular to this longitudinal edge (FIG. 2).

According to a modified embodiment of the invention, shown in FIG. 3 of the accompanying drawings, the laterally projecting portion 6 of the male portion 2 can also be connected to the longitudinal edge carrying said male portion 2 directly by its face 6' opposite the surface 2' of the male portion 2, at an acute angle.

It is generally possible, according to the modified embodiment shown in FIGS. 4 to 6 and 8 of the accompanying drawings, to double the male portions 2 and female portions 3 equipping the longitudinal oblique edges of said panels, laths or wainscots 1 and to provide on each longitudinal edge, in an adjacent manner, a male portion 2 and a female portion 3 coacting with a female portion 3 and a male portion 2 of the opposite edge, these male and female portions 2 and 3 of two opposite edges being disposed in alternate relationship and providing a double assembly with a groove and tongue. Such embodiments permit obtaining a locking in position together of the panels, laths or wainscots 1.

Figure 8:
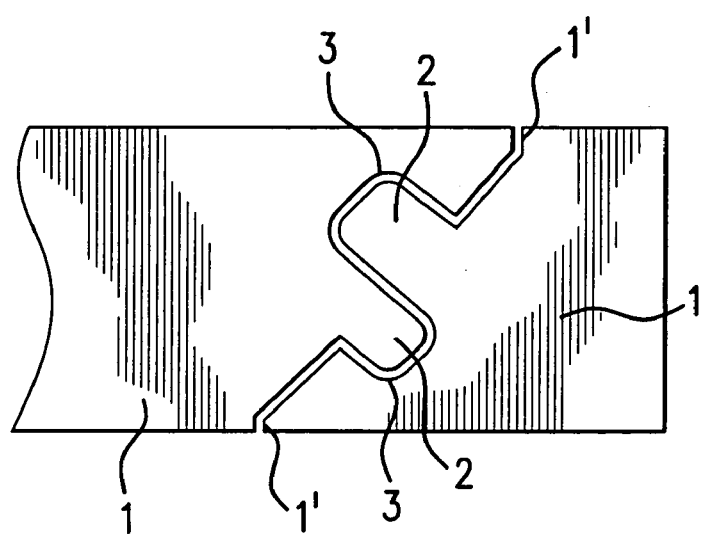

As shown more particularly in FIG. 8 of the accompanying drawings, the tongue and groove forming the male portion 2 and female portion 3 can be made of curvilinear male and female portions mutually interfitting and ensuring locking in position of the panels, laths or wainscots 1 together.

To permit obtaining a perfect surface finish of the panels, laths or wainscots 1 at the joints, in particular to avoid a risk of deterioration of the decorative surface, the oblique parallel planes forming the longitudinal edges carrying the male and female portions 2 and 3 are preferably connected to the upper and lower surfaces of said panels, laths or wainscots 1 by means of edges 1' of these latter, which extend perpendicularly to said upper and lower surfaces (FIGS. 4 to 8).

Figure 7:
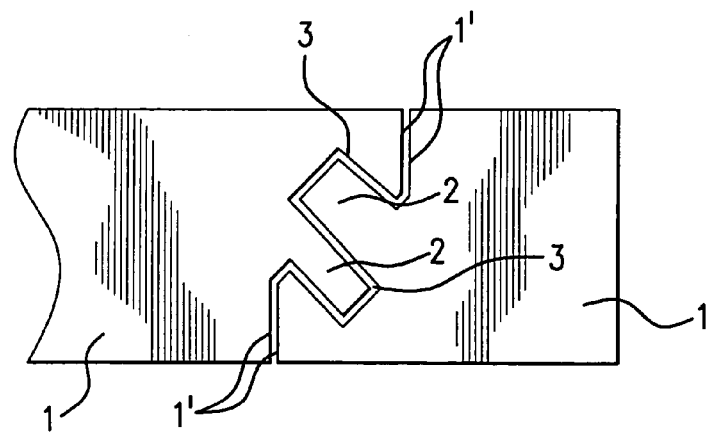

FIG. 7 of the accompanying drawings shows a modified embodiment of the invention, in which the edges 1' of the upper and lower surfaces of the panels, laths or wainscots 1 are directly connected to the male and female portions 2 and 3, whose bases and end surfaces in mutual contact extend along oblique parallel planes. Thus, it is possible to carry out a connection with self-joining, self-gripping and automatic locking, whilst ensuring the production of continuity of decorative surface at the level of the joint.

Figure 4:
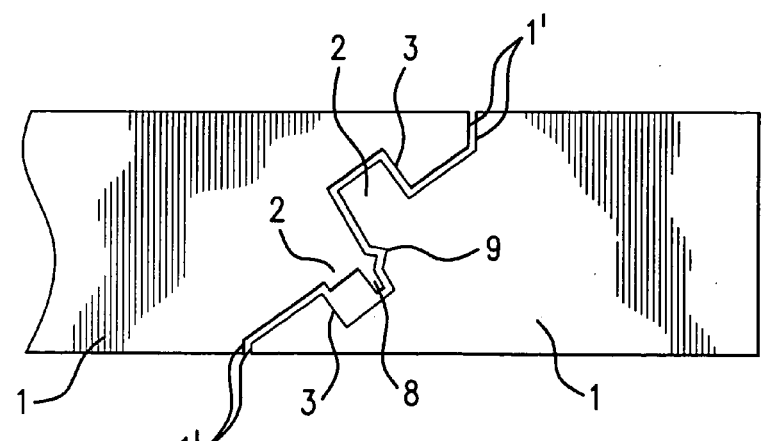
FIG. 4 is a view analogous to those of FIGS. 2 and 3, of a modified embodiment of the invention.
Figure 6:
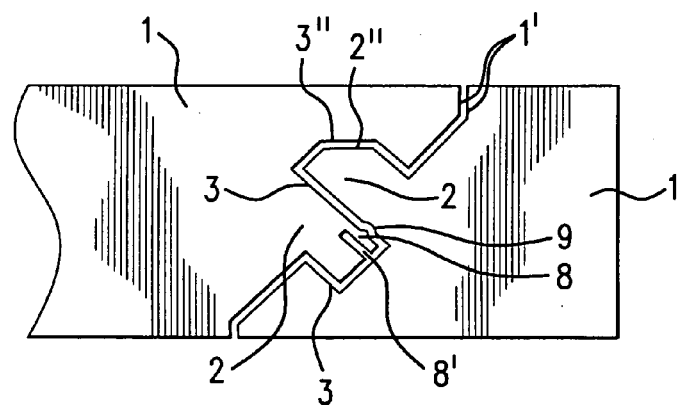
FIGS. 6 to 8 are views analogous to those of FIGS. 2 to 5, of other modified embodiments of the invention.

According to another modified embodiment of the invention, and as shown in FIGS. 4 and 6 of the accompanying drawings, at least one of the male portions 2 can be provided, at its end penetrating the corresponding female portion 3, with a locking element 8 by shape-matingly fitting into a corresponding recess 9 of said female portion 3. This locking element 8 can be in the form of an elastic tongue provided with a snap-in rib (FIG. 4) coacting with a recess of the female portion 3, either in the form of a resilient blade made by formation of a parallel longitudinal groove 8' in the male portion 2, this blade being provided with the snap-in rib coacting with the recess 9 of the female portion 3 (FIG. 6). Such a locking element permits perfecting the engagement of the assembly device between the panels, laths or wainscots 1 during the final assembly operation whilst avoiding destruction by aging following repeated manipulations of assembly and disassembly, because of the elasticity of the element 8.

According to another characteristic of the invention, shown in FIG. 6 of the accompanying drawings, at least one edge 2" of a male portion 2 and corresponding angle 3" of the coacting female portion 3 are preferably cut by a flat surface extending parallel to the upper and lower surfaces of the panels, laths or wainscots 1. The provision of such horizontal bearing surfaces, for example relative to the walking surface of a floor, permits absorption of the shear forces due to vertical loads. Moreover, these services guarantee that the upper surface of the panels, laths or wainscots 1 will be perfectly flush at the assembly joints.

Figure 5:
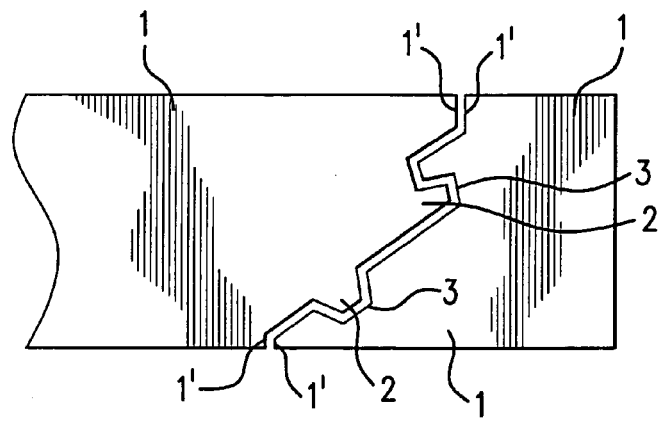
FIG. 5 is a view similar to those of FIGS. 2 and 3, of another modified embodiment of the invention.

FIG. 5 of the accompanying drawings shows another modified embodiment of the invention, in which the assembly device is completed by a second assembly of male and female portions 2 and 3 forming simultaneously a self-locking means, a self-joining means and means for holding in the service position.

According to a characteristic of the invention, not shown in the accompanying drawings, at least one of the male and female portion assemblies 2 and 3 has rounded shapes. Thus, for example, the assembly forming simultaneously the self-locking means, the self-joining means and the means for holding in service position, can be present in the form, on the one hand, of a substantially semi-cylindrical appendix and, on the other hand, of a recess of corresponding cross-section.

The male and female portions 2 and 3 on the longitudinal edges of the panels, laths or wainscots 1 have, preferably, sidewalls inclined in the direction of narrowing of the cross-section from the base toward the summit of the male portions and a flaring from the base to the opening of the female portion. Thus, during assembly or disassembly of the panels, laths or wainscots 1, the insertion of the male portions 2 into the female portions 3 is facilitated, this insertion taking place by presentation of the panel, lath or wainscot 1 to be emplaced, at a more or less great inclination relative to the horizontal and to the panel, lath or wainscot 1 already in place.

Moreover, so as further to promote the insertion of the male portions 2 into the corresponding female portions 3, the connecting edges of the angles delimiting said male portions 2, as well as the angles delimiting the recesses forming the female portions 3, are preferably slightly grounded or chamfered.

Thus, at the beginning of the penetration of a male portion 2 into a female portion 3 is facilitated, whilst the course of the assembly of the edges takes place by intimate contact of the corresponding surfaces, such that the assembly is made in a self-locking, self-joining and self-gripping manner.

Figure 9:
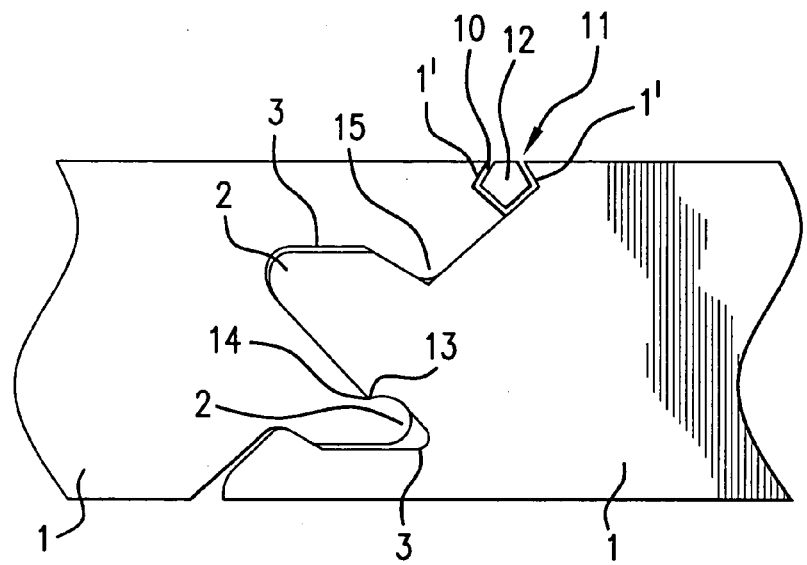
FIGS. 9 and 10 are views analogous to those of FIGS. 2 to 8, on a larger scale, of two other modified embodiments of the invention.
Figure 10:
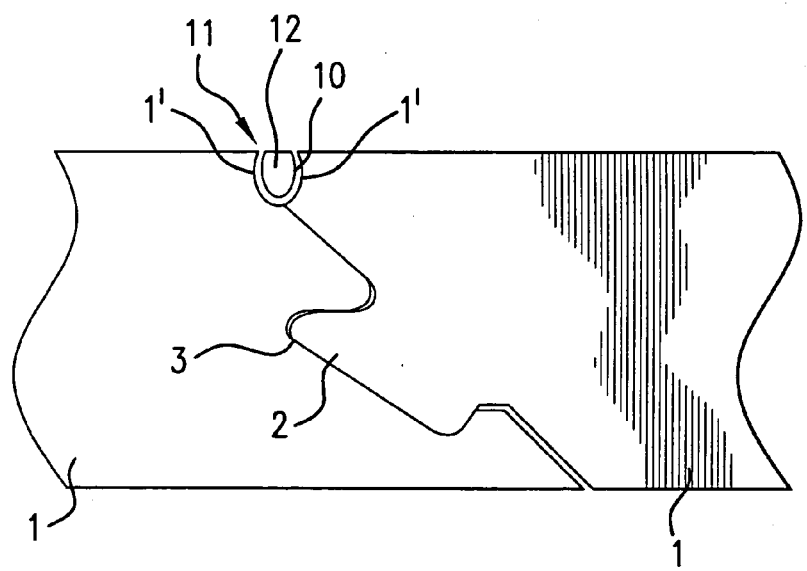

FIGS. 9 and 10 of the accompanying drawings show, on a larger scale, other modifications of embodiment of the invention, in which the edges 2' connecting the oblique parallel planes forming the longitudinal edges, have their male and female portions 2 and 3 at the upper surface of the panels, laths or wainscots 1 and extending perpendicular to said upper surface, are preferably provided each with a longitudinal recess 10 that is partially open along said upper surface and delimiting each with the recess 10 of the longitudinal edge of the adjacent panel, lath or wainscot 1, a throat 11 for reception of a joint element 12, in the form of a mastic, of a rod or the like.

Preferably, the recesses 10 of the longitudinal edges of the panels, laths or wainscots 1 have a shape that flares inwardly of said panels, laths or wainscots 1, permitting obtaining throats 11 flaring inwardly of the assembly of panels, laths or wainscots 1. Such an embodiment permits having, between the panels, laths or wainscots 1, during their mounting, joint elements 12 serving as decorative or joining elements. Moreover, the flaring of the recesses 11 permits insertion by snapping in resiliently deformable joint elements and their holding in surface position. Thus, it is possible to provide an assembly of panels having an appearance of ceramic tiles or the like, the joints between said files being formed by the elements 12. This embodiment of longitudinal recesses 10 is possible because of the provision of oblique planes, which permit obtaining thicknesses of material sufficient to undergo corresponding machining, which is not possible in the presence of joint planes perpendicular to the upper and lower surfaces.

According to another characteristic of the invention and as shown in FIG. 9, at least one male portion 2 of one of the oblique parallel planes forming the longitudinal edges of the panels, laths or wainscots 1, is provided with a locking means 13 in the form of a longitudinal groove, which coacts shape-matingly with a means 14 of the corresponding female portion 3, constituted by a longitudinal rib, the assembly being carried by resilient deformation of the means 13 and 14. Such an embodiment permits supplemental locking in position, by snapping, giving rise to an improvement of self-locking and self-joining already conferred by the assembly of multiple tongues and grooves.

Moreover, at least one pair of recess 3—male portion 2 of the assembly can be completed by at least one supplemental locking means 15 in the form of a longitudinal projection and a corresponding recess.

Moreover, FIG. 9 shows another characteristic of the invention, according to which the ends of the male portions 2 and the bottom of the recesses forming the female portions 3 have a surface parallel to that of the upper and lower surfaces of the panels, laths or wainscots 1, the recesses forming the female portions 3 having a depth slightly greater than the height of the male portions 2. Thus, there exists in the assembled position an operational play permitting absorbing the loads in line with the joints and ensuring self-joining and self-gripping at three different points, at the male portions 3 and at the locking device 15.

According to another characteristic of the invention, the male portions 2 in a same oblique plane extend in opposite directions.

Figure 11:
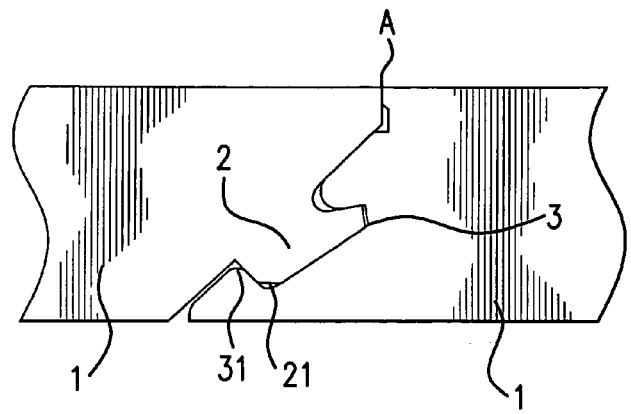
FIGS. 11 to 13 are views analogous to that of FIG. 10 of other modified embodiments of the device.
Figure 12:
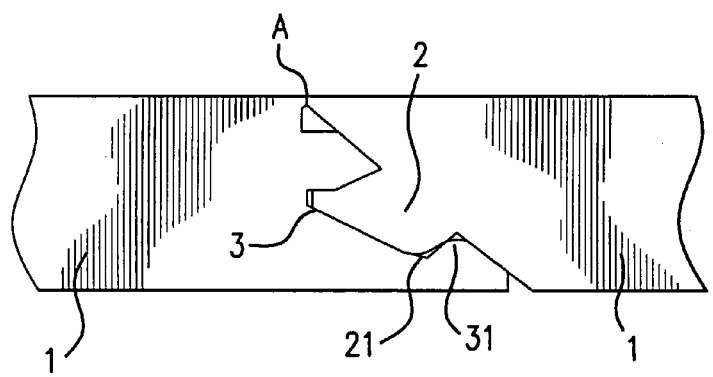
Figure 13:
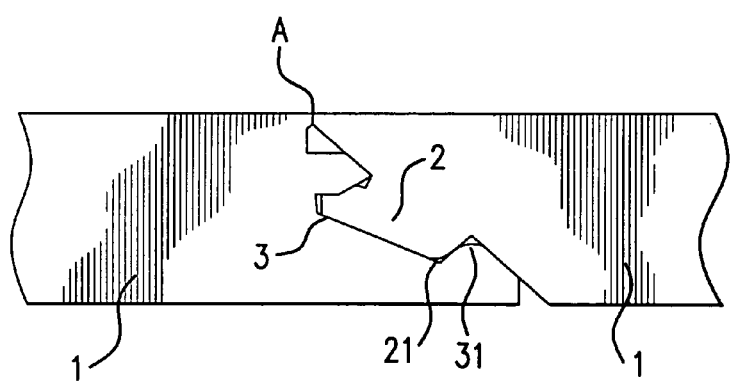

FIGS. 11 to 13 show other modified embodiments of the invention, in which the inlet edges of the recesses forming the female portion or portions 3 of at least one of the oblique parallel planes forming the longitudinal edges of the panels, laths or wainscots 1, as well as the corresponding edges of the male portion or portions 2 of the other oblique plane, are preferably provided each with a longitudinal ramp 31, 21 forming respectively an enlargement in the shape of a funnel at the inlet of the female portion or portions 3 and a flaring starting from the summit of the male portion or portions 2, these longitudinal inclined ramps 31 and 21 being provided on the edges of the corresponding female and male portions 3 and 2 farthest from the pivotal point A of the assembly between two panels, laths or wainscots 1.

The provision of these ramps 31 and 21 permits promoting easy penetration of the male portions 2 into the female portions 3, with exertion of minimal assembly force and hence with a very small force against the walls of the recesses or female portions 3, such that the edges of said female portions 3 are subject to reduced deformation, or even none, which permit avoiding the risk of breaking which would lead to discarding.

As shown more particularly in FIGS. 12 and 13 of the accompanying drawings, the ends of the ramp or ramps 21 provided on the male portions 2 have, relative to the pivotal point A of the assembly between two panels, laths or wainscots 1, a distance or a radius increasing from the summit of said male portions 2 toward their connection foot to the corresponding longitudinal edge. Simultaneously, the ends of the ramp or ramps 31 provided at the inlet of the female portion or portions 3 have, relative to the points A of pivoting of the assembly between two panels, laths or wainscots 1, a distance or a radius decreasing from the inlet of said female portions 3 toward the bottom of the latter.

Such an embodiment permits easy insertion of the male portion 2 into the female portion 3, whilst ensuring the holding and the locking in position of the mounting of the panels, laths or wainscots. Moreover, this provision of ramps 21 and 31 also permits avoiding a large deformation of the edges of the recesses forming the female portions 3 and hence their destruction.

FIG. 13 of the accompanying drawings shows another modified embodiment of the invention, in which the oblique planes forming the longitudinal edges of the panels, laths or wainscots 1 are subdivided into at least two planar portions, parallel or not, offset and connected each to a connection edge by a male portion 2 or a female portion 3. Thus it is possible to increase the inter-engaging sections of the male and female portions 2 and 3, such that their resistance to tearing off is substantially improved.

Figure 14:
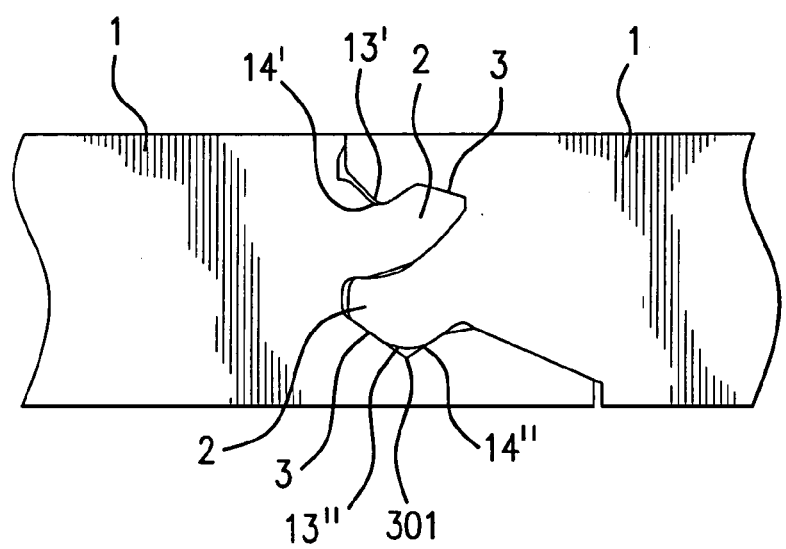
FIG. 14 is a view similar to that of FIG. 10 of another modified embodiment of the invention.

FIG. 14 of the accompanying drawings shows another modified embodiment of the invention, in which two male portions 2 of two oblique parallel planes forming the longitudinal edges of the panels, laths or wainscots 1 are provided each with a means 13', 13" for locking, respectively in the form of a longitudinal groove 13', provided on the upper male portion 2, which coacts with a means 14' coacting in shape and constituted by a longitudinal rib of the corresponding female portion 3, and a longitudinal rib 13", provided below the lower male portion 2, which coacts with a shape-mating means 14" constituted by a longitudinal groove of the corresponding female portion 3. As a result, there is a double locking of the assembly thus produced.

According to another characteristic of the invention, also shown in FIG. 14 of the accompanying drawings, the inlet edges of the recesses forming the female portion or portions 3 of the oblique parallel planes forming the longitudinal edges of the panels, laths or wainscots 1 are preferably disposed in a same vertical plane and have a locking portion 301 located entirely within the recesses 3 behind said vertical plane.

According to a modified embodiment of the invention shown in broken lines in FIG. 14, the lower edge of the lower recess 3 can be provided directly by a vertical plane at the lower surface of the panel, lath or wainscot 1. Such an embodiment permits obtaining a more robust assembly device, the lower portion of the panel, lath or wainscot 1 delimiting the opening of the lower recess 3 being able to have a relatively great thickness and hence a larger mechanical resistance.

According to another modified embodiment of the invention not shown in the accompanying drawings, the lower edge delimiting the lower recess 3 can also be disposed retracted relative to the vertical plane passing through the upper edge of said recess 3, toward the interior of the panel, lath or wainscot 1. Such an arrangement particularly promotes the easier introduction of the male element or tongue 2.

The different possible modifications according to FIG. 14 permit assembly between two successive panels, laths or wainscots 1 which is still provided with an offset between the upper and lower joints, the lower edge of the lower recess 3 being connected to the lower surface of the panel, lath or wainscot 1 by an oblique wall or by a vertical wall. Moreover, such an assembly avoids any possibility of accidental disassembly. Moreover, the assembly of such panels, laths or wainscots 1 can easily be carried out by an oblique insertion movement in a direction parallel to the axis of the opening of the recess 3. This insertion can also be carried out by a flat movement of the new panel, lath or wainscot 1 with a stop at the end of insertion by means of a wedge and a hammer to carry out slight forcing of the male portion or tongue 2 into the female portion or recess 3.

In the assembled positions obtained according to the present invention and shown in FIGS. 1 to 14, it will clearly be seen that the coaction of the different elements on the adjacent lateral edges of the panels, laths or wainscots 1 to be assembled permit producing, on the one hand, a perfect positioning of a panel, lath or wainscot with the next one and the preceding one and, on the other hand, a gripping and a locking in position of such panels, laths or wainscots with each other.

Moreover, because of the oblique positioning of the assembly surfaces of the assembly device, any application of force to a joint has the effect of transmitting substantially the force applied directly to the oblique surfaces, while the assembly device is practically not loaded directly and, in particular, is subjected only to a very low shear force.

The assembly of the corresponding edges of the panels, laths or wainscots can be easily carried out by placing together the inlet opening of the female portion or portions 3 with the free edge of the tongue or tongues forming the male portion or portions 2, this with a slight preliminary inclination of the panel, lath or wainscot to be connected, this inclination more and more approaching the horizontal to the extent that the male and female portions 2 and 3 of the panels, laths or wainscots 1 to be assembled are coordinated.

Moreover, the shape of the mating parts, in particular according to FIGS. 2, 5 and 9 to 14, permits correcting for possible deformation of the longitudinal warping type, which can take place in the case of panels of small thickness relative to their surface.

Thanks to the invention, it is possible to produce panels, laths or wainscots, whose assembly of the longitudinal edges permits self-gripping and self-joining of said edges, as well as self-locking of said panels, laths or wainscots in assembled position, whilst permitting longitudinal movement of said panels, laths or wainscots 1 for their assembly by tongue and groove along their lateral edges.

Moreover, the invention permits an optimum assumption and distribution of loads, such as resultant forces applied particularly to the longitudinal edges of the panels, laths or wainscots and that the assembly means properly so-called is practically not subjected to any force likely to lead to its fatigue destruction.

Moreover, because of the provision of lateral edges of the panels, laths or wainscots in the form of oblique planes, it is possible, for a predetermined thickness of said panels, laths or wainscots, to dimension the assembly device in a manner more important than in the case of the provision of a vertical embodiment of said longitudinal edges. As a result, the sections of the elements of the assembly device are greater and hence stronger.

Moreover, in the embodiment according to FIGS. 4 and 6 to 9, the assembly of the corresponding edges of the panels, laths or wainscots 1 can be easily carried out by matching the male and female portions 2 and 3 from above and by an oblique parallel movement at the angle forming the axes of said portions 2 and 3 relative to the lateral edges of the panels, laths or wainscots 1.

The panels, laths or wainscots thus provided can be machined in a particularly simple manner with present tooling and with relatively reduced need for intermediate adjustment of the tooling.

As a result, the panels, laths or wainscots thus produced are of lower price than those known at present, whilst offering increased resistance at the joint.

Of course, the invention is not limited to the embodiments described and shown in the accompanying drawings. Modifications remain possible, particularly as to the construction of the various elements or by substitution of technical equivalents, without thereby departing from the scope of protection of the invention.

The invention claimed is:

1. Device for assembling longitudinal edges of panels, laths or wainscots (1), constituted by at least one male portion (2) on a longitudinal edge of said panels, laths or wainscots (1) and by at least a female portion (3) of corresponding shape on the other longitudinal edge of said panels, laths or wainscots (1), characterized in that there is a distribution of forces, in that the longitudinal edges carrying the male and female portions (2 and 3) extend along parallel oblique planes, in that it is provided with self-locking and self-joining means and means for holding in service position in the form of at least one longitudinal shoulder (4) connecting at least one edge of the tongue (2), forming the male portion of the device, to the corresponding longitudinal edge and coacting with another shoulder (5) provided on the corresponding edge delimiting the female portion (3) of the assembly device and in that the male portion (2) in the form of a longitudinal tongue has, on the side (4') opposite that forming the shoulder (4), a portion (6) laterally projecting relative to this side (4') and forming an acute angle with, the oblique surface carrying the male portion (2), this laterally projecting portion (6) coacting with a hollow (7) of the recess forming the female portion (3).

2. Device according to claim 1, characterized in that the joint between two successive panels, laths or wainscots (1) is in line with the end of the male portion.

3. Device according to claim 1, characterized in that the joint between two successive panels, laths or wainscots (1) is in line with the male and female portions (2 and 3).

4. Device according to claim 1, characterized in that the joint between two successive panels, laths or wainscots (1) is outside the vertical plane comprising the male and female portions (2 and 3).

5. Device according to claim 1, characterized in that the male and female portions (2 and 3) are present respectively in the form of a longitudinal tongue inclined substantially at a right angle relative to a first longitudinal edge bearing it and a recess of corresponding shape provided in the other longitudinal edge and whose inclination is complementary to that of the tongue on the first longitudinal edge.

6. Device according to claim 1, characterized in that the tongue forming the male portion (2) extends upwardly or downwardly and coacts with a recess (3) forming the female portion.

7. Device according to any one of claims 1 and 5, characterized in that the male and female portions (2 and 3) are of simple tongue and groove shape of square or rectangular shape extending perpendicularly relative to the longitudinal oblique edges of the panels, laths or wainscots (1).

8. Device according to claim 1, characterized in that the laterally projecting portion (6) of the male portion (2) is in the form of a longitudinal appendix having a cross-section narrowing from the longitudinal edge of the panel, lath or wainscot (1) in the direction of the free end of said longitudinal appendix.

9. Device according to any one of claims 1 and 6, characterized in that the surface (2') of the male portion (2) connecting the sides (4 and 4') or the side (4) of the external edge of the laterally projecting portion (6) of the male portion (2) is preferably present in the form of a flat surface.

10. Device according to any one of claims 1, 8 and 9, characterized in that the laterally projecting portion (6) of the male portion (2) is connected to the longitudinal edge carrying said male portion (2) by a side (4') substantially perpendicular to this longitudinal edge.

11. Device according to any one of claims 1 and 8 to 10, characterized in that the laterally projecting portion (6) of the male portion (2) is connected to the longitudinal edge carrying said male portion (2) directly by its surface (6') opposite the surface (2') of the male portion (2), at an acute angle.

12. Device according to claim 1, characterized in that the male and female portions (2 and 3) are doubled and, on each longitudinal edge are disposed, adjacently, a male portion (2) and a female portion (3) coacting with a female portion (3) and a male portion (2) of the opposite edge, these male and female portions (2 and 3) of two edges being disposed alternatingly and providing a double tongue and groove assembly.

13. Device according to any one of claims 1 to 7 and 8 to 12, characterized in that the tongue and groove forming the male and female portions (2 and 3) are made from curvilinear male and female elements mutually fitting together and ensuring locking in position of the panels, laths or wainscots (1) with each other.

14. Device according to claim 1, characterized in that the oblique parallel planes forming the longitudinal edges carrying the male and female portions (2 and 3) are connected to the upper and lower surfaces of the panels, laths or wainscots (1) by means of edges (1') of these latter, which extend perpendicularly to said upper and lower surfaces.

15. Device according to claim 12, characterized in that the edges (1') of the upper and lower surfaces of the panels, laths or wainscots (1) are directly connected to the male and female portions (2 and 3), whose bases and end surfaces in mutual contact extend along oblique parallel planes.

16. Device according to any one of claims 1 to 5, 7 and 8 to 14, characterized in that at least one of the male portions (2) is provided, at its end entering the corresponding female portion (3), with a locking element (8) by shape cooperation engaging in a corresponding recess (9) of said female portion (3).

17. Device according to claim 16, characterized in that the locking element (8) is constituted by a resilient tongue provided with a snap-in rib coacting with the recess of the female portion (3).

18. Device according to claim 16, characterized in that the locking element (8) is constituted in the form of a resilient blade made by formation of a parallel longitudinal groove (8') in the male portion (2), this blade being provided with the snap-in rib coacting with the recess (9) of the female portion (3).

19. Device according to any one of claims 1 to 7 and 8 to 15, characterized in that at least one edge (2') of a male portion (2) and the corresponding angle (3") of the coacting female portion (3) are cut by a flat surface extending parallel to the upper and lower surfaces of the panels, laths or wainscots (1).

20. Device according to any one of claims 1 to 7 and 12, characterized in that it is completed by a second assembly of male and female portions (2 and 3) forming simultaneously a self-locking and self-joining means and means for holding in surface position.

21. Device according to claim 20, characterized in that at least one of the assemblies of male and female portions (2 and 3) has rounded shapes.

22. Device according to any one of claims 1 to 7, 8 to 12, 14 to 16 and 20, characterized in that the male and female portions (2 and 3) on the longitudinal edges of the panels, laths or wainscots (1) have lateral walls inclined in the direction of a narrowing of the cross-section from the base toward the summit of the male portions and a flaring from the base to the opening of the female portions.

23. Device according to any one of claims 1 to 7, 8 to 12, 14 to 16 and 20, characterized in that the connecting edges of the acute angles delimiting the male portion (2), as well as the acute angles delimiting the recess forming the female portion (3), are slightly rounded or beveled.

24. Device according to any one of claims 14 and 15, characterized in that the edges (1') connecting the parallel oblique planes forming the longitudinal edges, carrying the male and female portions (3) to they upper surface of the panels, laths or wainscots (1) and extending perpendicularly to said upper surface, are each provided with a longitudinal recess (10) partially open along said upper surface and each delimiting with the recess (10) of the longitudinal edge a panel, lath or wainscot (1) adjacent a throat (11) for reception of a joint element (12) in the form of a mastic, a rod or the like.

25. Device according to claim 24, characterized in that the recesses (10) of the longitudinal edges of the panels, laths or wainscots (1) have a shape flaring inwardly of said panels, laths or wainscots (1) permitting obtaining throats (11) flaring inwardly of the assembly of panels, laths or wainscots (1) when assembled.

26. Device according to any one of claims 1 to 7, 12 and 13, characterized in that at least one male portion (2) of one of the oblique parallel planes forming the longitudinal edges of the panels, laths or wainscots (1) is provided with locking means (13) in the form of a longitudinal groove, which coacts with a means (14) of cooperating shape of the corresponding female portion (3), constituted by a longitudinal rib, the assemblage of the assembly being carried out by plastic deformation of the locking means 113 and 14).

27. Device according to any one of claims 1 to 7, 12, 13 and 26, characterized in that at least one pair of recess (3)—male portion (2) of the assembly is completed by at least one supplemental locking means (15) in the form of a longitudinal projection and a corresponding recess.

28. Device according to any one of claims 1 to 7, 12, 19, 20, 22 and 23, characterized in that the ends of the male portions (2) in the bottom of the recesses forming the female portions (3) have a surface parallel to that of the upper and lower surfaces of the panels, laths or wainscots (1).

29. Device according to any one of claims 12, 13, 15, 16, 19, 20, 22, 23 and 26 to 28, characterized in that the male portions (2) in a same oblique plane extend in opposite directions.

30. Device according to claim 23, characterized in that the inlet edges of the recesses forming the female portion or portions (3) of at least one of the oblique parallel planes forming the longitudinal edges of the panels, laths or wainscots (1), as well as the corresponding edges of the male portion or portions (2) of the other oblique plane are each provided with an inclined longitudinal ramp (31, 21) forming respectively an enlargement of funnel shape at the inlet of the female portion or portions (3) and a flaring starting from the summit of the male portion or portions (20), these inclined longitudinal ramps (31 and 21) being provided on the edges of the corresponding male and female portions (2 and 3) farthest from a point of pivoting of the assembly (A) between two panels, laths or wainscots (1).

31. Device according to claim 30, characterized in that the ends of the ramp or ramps (21) provided on the male portions (2) have, relative to the pivotal point of the assembly (A) between two panels, laths or wainscots (1) a distance or a radius increasing from the summit of said male portions (2) toward their foot of connection to the corresponding longitudinal edge.

32. Device according to claim 30, characterized in that the ends of the ramp or ramps (31) provided at the inlet of the female portion or portions (3) have, relative to the pivotal point of the assembly (A) between two panels, laths or wainscots (1) a distance or a radius decreasing from the inlet of said female portions (3) toward the bottom of these latter.

33. Device according to claim 1, characterized in that the oblique planes forming the longitudinal edges of the panels, laths or wainscots (1) are subdivided into at least two portions of a plane, parallel or not, offset and connected each to one connection edge of a male portion (2) or of a female portion (3).

34. Device according to any one of claims 1 to 7, 12, 13 and 26, characterized in that two male portions (2) of two oblique parallel planes forming the longitudinal edges of the panels, laths or wainscots (1) are each provided with a blocking means (13', 13"), respectively in the form of a longitudinal groove (13'), provided on the upper male portion (2), which coacts shape-matingly with a means (14') constituted by a longitudinal rib of the corresponding female portion (3), and a longitudinal rib (13") provided below the lower male portion (2), which coacts shape-matingly with a means (14") constituted by a longitudinal groove of the corresponding female portion (3).

35. Device according to claim 1, characterized in that the inlet edges of the recesses forming the female portion or portions (3) of the oblique parallel planes forming the longitudinal edges of the panels, laths or wainscots (1) are disposed in a same vertical plane and have a locking portion (301) located entirely within the recesses (3) behind said vertical plane.

36. Device according to claim 35, characterized in that the lower edge of the lower recess (3) is directly connected by a vertical plane to the lower surface of the panel, lath or wainscot (1).

37. Device according to claim 1, characterized in that the lower edge delimiting the lower recess (3) is disposed retracted from the vertical plane passing through the upper edge of said recess (3), toward the interior of the panel, lath or wainscot (1).

* * * * *